US008978319B2

(12) United States Patent
Patino

(10) Patent No.: US 8,978,319 B2
(45) Date of Patent: Mar. 17, 2015

(54) SYSTEM AND METHOD FOR MODULAR HOUSING

(75) Inventor: Ricardo Patino, Plano, TX (US)

(73) Assignee: Global Homes, LLC, Richardson, TX (US)

(*) Notice: Subject to any disclaimer, the term of this patent is extended or adjusted under 35 U.S.C. 154(b) by 0 days.

(21) Appl. No.: 13/180,302

(22) Filed: Jul. 11, 2011

(65) Prior Publication Data
US 2012/0005968 A1    Jan. 12, 2012

Related U.S. Application Data

(60) Provisional application No. 61/363,100, filed on Jul. 9, 2010.

(51) Int. Cl.
| E04H 1/02 | (2006.01) |
| E04B 1/12 | (2006.01) |
| E04H 1/12 | (2006.01) |
| E04B 1/00 | (2006.01) |
| E04B 1/343 | (2006.01) |
| E04B 1/61 | (2006.01) |
| F16B 5/00 | (2006.01) |
| F16B 15/00 | (2006.01) |

(52) U.S. Cl.
CPC .............. *E04H 1/1205* (2013.01); *E04B 1/003* (2013.01); *E04B 1/34321* (2013.01); *E04B 1/615* (2013.01); *E04B 1/6179* (2013.01); *E04B 2001/34389* (2013.01); *E04B 2001/6195* (2013.01); *F16B 5/0056* (2013.01); *F16B 5/0088* (2013.01); *F16B 15/00* (2013.01)
USPC .......................................... 52/79.1; 52/745.02

(58) Field of Classification Search
CPC ..... E04B 1/003; E04B 1/34321; E04B 1/615; E04B 1/6179; E04B 2001/34389; E04B 2001/6195; E04H 1/1205; F16B 15/00; F16B 5/0056; F16B 5/0088
USPC .......... 52/79.5, 79.1, 126.7, 126.5, 79.9, 156, 52/155, 181, 285.2, 585.1, 745.01, 745.02
See application file for complete search history.

(56) References Cited

U.S. PATENT DOCUMENTS

| 2,663,915 | A | * | 12/1953 | Dietrich | ............................ 52/155 |
| 3,511,001 | A | * | 5/1970 | Morgan, Jr. | .................. 52/126.5 |
| 3,659,333 | A | | 5/1972 | Johnson et al. | |
| 3,703,058 | A | | 11/1972 | Klett et al. | |
| 3,775,918 | A | * | 12/1973 | Johnson | ............................ 52/155 |
| 3,937,437 | A | * | 2/1976 | Stewart | .......................... 248/499 |

(Continued)

FOREIGN PATENT DOCUMENTS

WO    WO 2010029154 A2 *  3/2010

*Primary Examiner* — Basil Katcheves
*Assistant Examiner* — Rodney Mintz
(74) *Attorney, Agent, or Firm* — Grady K. Bergen; Griggs Bergen LLP

(57) ABSTRACT

It is an object of the present invention to provide a modular structure comprising a base, four upstanding sidewalls, and a roof. In various embodiments, the structure may include a clamping system adapted to interconnect the base, sidewalls, and roof. In various embodiments, a beam may be disposed across the top of two opposing sidewalls to provide structural support for the roof. In various embodiments, the collapsible container may be disassembled, for example for transport, and reassembled for reuse. In various embodiments, the collapsible container, when assembled, may be used as a housing structure adapted for use as a mobile work station, temporary housing, or barracks.

20 Claims, 25 Drawing Sheets

(56) References Cited

U.S. PATENT DOCUMENTS

| | | | |
|---|---|---|---|
| 3,955,328 A | 5/1976 | Lindsay | |
| 3,969,872 A | 7/1976 | Wesse | |
| 4,222,208 A | 9/1980 | Ferver | |
| 4,512,120 A | 4/1985 | Lindal | |
| 4,644,708 A | 2/1987 | Baudot et al. | |
| 4,876,832 A * | 10/1989 | Wasserman | 52/79.1 |
| 4,947,615 A | 8/1990 | Peacock | |
| 5,094,048 A | 3/1992 | Woo | |
| 5,159,791 A | 11/1992 | Juhas | |
| 5,172,526 A | 12/1992 | Morgan | |
| 5,209,030 A | 5/1993 | Sloditskie et al. | |
| 5,227,013 A | 7/1993 | Kumar | |
| 5,293,725 A * | 3/1994 | Matticks et al. | 52/271 |
| 5,524,412 A | 6/1996 | Corl | |
| 5,562,519 A * | 10/1996 | Loewenton | 446/126 |
| 5,638,851 A | 6/1997 | Baldwin | |
| 5,647,177 A * | 7/1997 | Hwang | 52/79.5 |
| 5,724,774 A | 3/1998 | Rooney | |
| 5,758,463 A | 6/1998 | Mancini, Jr. | |
| 5,971,655 A * | 10/1999 | Shirakawa | 404/40 |
| 6,176,059 B1 | 1/2001 | Cantarano et al. | 52/578 |
| 6,233,891 B1 * | 5/2001 | De Cosse | 52/309.12 |
| 6,250,022 B1 | 6/2001 | Paz et al. | |
| 6,256,960 B1 | 7/2001 | Babcock et al. | |
| 6,591,558 B1 | 7/2003 | De Zen | |
| 6,668,514 B2 * | 12/2003 | Skov | 52/782.1 |
| 6,701,678 B1 | 3/2004 | Skov et al. | |
| 6,776,300 B2 | 8/2004 | Walsh et al. | |
| 6,871,453 B2 | 3/2005 | Locke | |
| D506,266 S | 6/2005 | Astle et al. | |
| 6,981,347 B1 | 1/2006 | Walburger | |
| 7,021,009 B2 | 4/2006 | Johnson | |
| 7,395,634 B2 * | 7/2008 | Anderson et al. | 52/79.1 |
| 7,509,776 B2 * | 3/2009 | Reisman | 52/281 |
| 7,658,038 B2 | 2/2010 | Mower et al. | |
| 7,707,783 B2 | 5/2010 | Mower et al. | |
| 7,914,228 B2 * | 3/2011 | Rapaz | 404/34 |
| 8,065,846 B2 * | 11/2011 | Mcdonald et al. | 52/281 |
| 8,272,175 B1 | 9/2012 | Williams-Prades et al. | |
| 8,333,039 B2 | 12/2012 | Hsu et al. | |
| 8,381,468 B2 | 2/2013 | Koupal | |
| 8,429,873 B2 | 4/2013 | Devine, Jr. | |
| 8,464,490 B2 * | 6/2013 | Rapaz | 52/592.1 |
| 8,555,559 B2 * | 10/2013 | DiGregory | 52/79.5 |
| 8,707,634 B2 * | 4/2014 | Anklam | 52/79.8 |
| 2004/0187402 A1 * | 9/2004 | Moon et al. | 52/79.5 |
| 2004/0221529 A1 * | 11/2004 | Zornes | 52/311.1 |
| 2004/0226246 A1 * | 11/2004 | Doty | 52/503 |
| 2005/0150892 A1 | 7/2005 | Miller | |
| 2005/0210762 A1 | 9/2005 | Broberg | |
| 2005/0223655 A1 * | 10/2005 | Mower et al. | 52/79.5 |
| 2006/0003044 A1 | 1/2006 | DiNello et al. | |
| 2006/0048459 A1 | 3/2006 | Moore | |
| 2007/0074462 A1 * | 4/2007 | Linares | 52/79.1 |
| 2007/0094963 A1 * | 5/2007 | McDonald et al. | 52/270 |
| 2007/0175108 A1 * | 8/2007 | Stein et al. | 52/79.5 |
| 2007/0256369 A1 | 11/2007 | Webb et al. | |
| 2007/0266667 A1 * | 11/2007 | Rapaz | 52/585.1 |
| 2007/0266669 A1 * | 11/2007 | Rapaz | 52/638 |
| 2008/0271402 A1 * | 11/2008 | Gingras | 52/506.02 |
| 2009/0007507 A1 * | 1/2009 | Zhai | 52/285.1 |
| 2009/0188188 A1 * | 7/2009 | Rivet | 52/270 |
| 2010/0024293 A1 * | 2/2010 | Son | 47/20.1 |
| 2010/0251632 A1 * | 10/2010 | Chen et al. | 52/95 |
| 2011/0214362 A1 * | 9/2011 | Huang | 52/79.5 |
| 2012/0088055 A1 * | 4/2012 | Davies | 428/44 |
| 2012/0213961 A1 * | 8/2012 | Graham et al. | 428/43 |
| 2012/0247043 A1 | 10/2012 | McDonald et al. | |
| 2012/0285104 A1 * | 11/2012 | Digregory | 52/79.5 |
| 2014/0047778 A1 * | 2/2014 | DiGregory | 52/2.25 |

* cited by examiner

SYSTEM AND METHOD FOR MODULAR HOUSING

CROSS-REFERENCE TO RELATED APPLICATIONS

The present application claims the benefit of U.S. Provisional Patent Application No. 61/363,100, filed Jul. 9, 2010.

BACKGROUND

1. Technical Field

The present invention relates generally to modular structures and more particularly, but not by way of limitation, to a modular housing system and method.

2. Background

Modular structures such as modular housing are areas of increasing demand. Oftentimes, modular housing can be utilized to provide temporary shelter following natural disasters such as hurricanes, fires, flooding, or tornadoes. In addition, the shortcoming of using canvas tents for long-term military deployments may be overcome by the use of modular housing.

Another type of modular structure includes storage enclosures. Sheds and the like are generally used for storing items such as, for example, lawn tools and recreational equipment. Such storage enclosures typically include a set of walls, a door, a floor, and a roof. The walls, roof, or floor may be formed by assembly and attachment of a plurality of separate panels using fasteners such as, for example, screws, bolts, nails, and pins. Known storage enclosures have several disadvantages. For example, many known storage enclosures require a substantial amount of time, labor, planning, and skill to install and uninstall. Additionally, known methods of coupling adjacent panels to form walls or the roof are destructive or invasive to the components themselves, making the sheds difficult to uninstall.

Another type of structure that is of a modular design is a collapsible container, such as those used for shipping containers. In general, shipping containers are used for transporting large items such as, for example, from a manufacturer to a customer. Some shipping containers are collapsible so they may be returned to the manufacturer for reuse. Collapsible shipping containers are often incorporated with a pallet type base. Many collapsible shipping containers comprise a base with side walls pivotally connected to the base.

The prior art has proposed a number of different panel systems, or kits, comprising blow molded or extruded panels and connector members for forming a wide variety of smaller-sized storage structures. These structures are generally suitable to store hand tools and smaller lawn equipment. Due to the nature of the manufacturing process, blow-molded plastic components cannot be formed with intricate shapes and/or sharp corners such as those required for integrated connectors. In addition, blow-molded plastic components are hollow and cannot be formed with integral strengthening ribs and gussets made possible with injection molding. Extruded components generally require hollow longitudinal conduits for strength. Due to the nature of the manufacturing process the conduits are difficult to extrude in long sections for structural panels. Thus, they require connectors to achieve adequate height for larger structures. Large structures must also withstand increased wind and snow loads when compared to smaller structures.

There are also commercial considerations that must be satisfied by any viable enclosure system or kit; considerations which are not entirely satisfied by state of the art products. The enclosure must be formed of relatively few component parts that are inexpensive to manufacture via conventional techniques. The enclosure must also be capable of being packaged and shipped in a knocked-down state. In addition, the system must be modular and facilitate the creation of a family of enclosures that vary in size but which share common, interchangeable components. The system must be easily and quickly assembled using minimal hardware and requiring a minimal number of tools. Further, the system must not require excessive strength to assemble or include heavy component parts.

To provide an inexpensive, reliable, and widely adaptable technique of assembling a modular storage assembly that avoids the above-referenced and other problems, would represent a significant advance in the art.

SUMMARY

It is accordingly an object of the present invention to provide a modular structure comprising a base, four upstanding sidewalls, and a roof. In various embodiments, the structure may include a clamping system adapted to interconnect the base, sidewalls, and roof. In various embodiments, a beam may be disposed across the top of two opposing sidewalls to provide structural support for the roof. In various embodiments, the collapsible container may be disassembled, for example for transport, and reassembled for reuse. In various embodiments, the collapsible container, when assembled, may be used as a housing structure adapted for use as a mobile work station, temporary housing, or barracks.

The above summary is not intended to represent each embodiment or every aspect of the present invention.

BRIEF DESCRIPTION OF THE DRAWINGS

A more complete understanding of various embodiments of the present invention may be obtained by reference to the following Detailed Description when taken in conjunction with the accompanying Drawings, wherein.

DETAILED DESCRIPTION OF ILLUSTRATIVE EMBODIMENTS

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1:
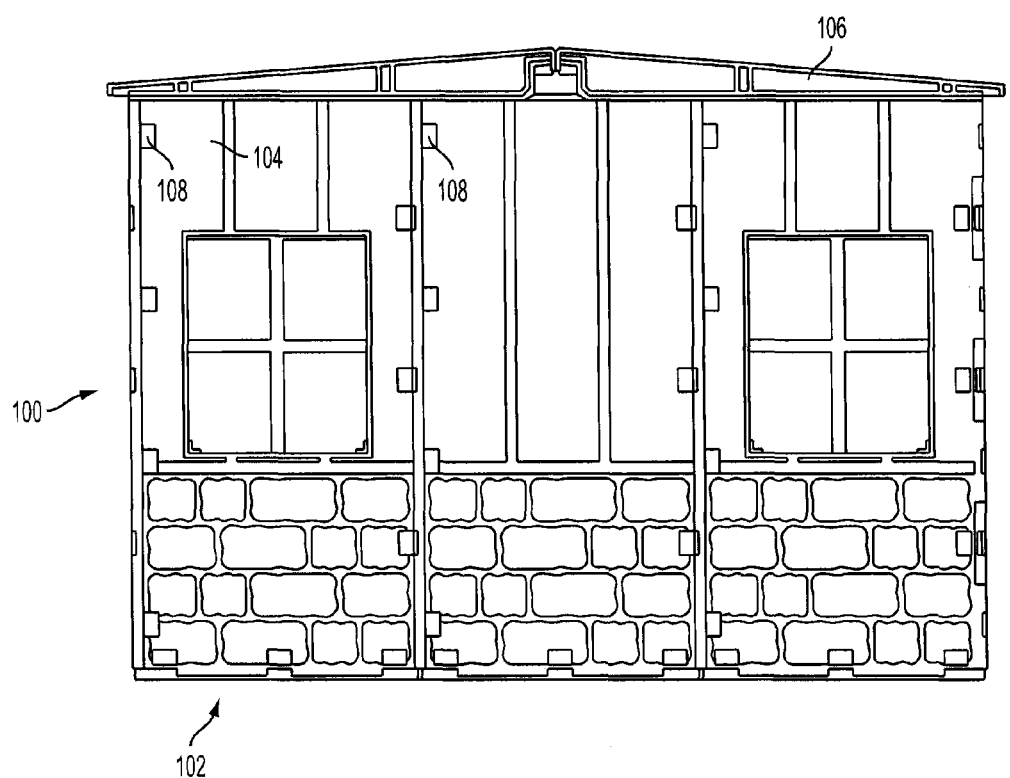
FIG. 1 illustrates a side view of a modular structure according to an embodiment of the present invention.

Referring to FIG. 1, a side view is shown of an embodiment of a modular structure 100. The modular structure 100 includes a floor assembly 102 coupled to a plurality of sidewall panels 104 to form the base and sides of the enclosure. The plurality of sidewall panels 104 are coupled together to provide structural support for a plurality of roof panels 106. As will be described in more detail below, the sidewall panels 104 are coupled together using a plurality of removable slide latches 108.

Figure 2:
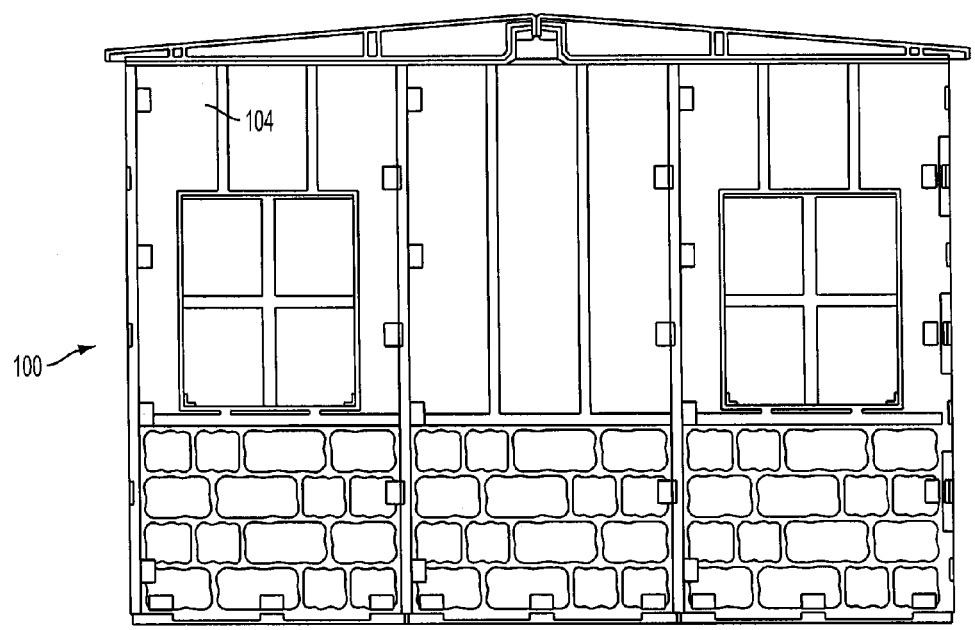
FIG. 2 illustrates a front view of the modular structure of FIG. 1.

Referring now to FIG. 2, a front view is shown of the modular structure 100 of FIG. 1. In various embodiments, a door (not explicitly shown in FIG. 2) may be disposed in a central portion of one of the sidewall panels 104 to provide ingress and egress to the modular structure 100.

Figure 3:
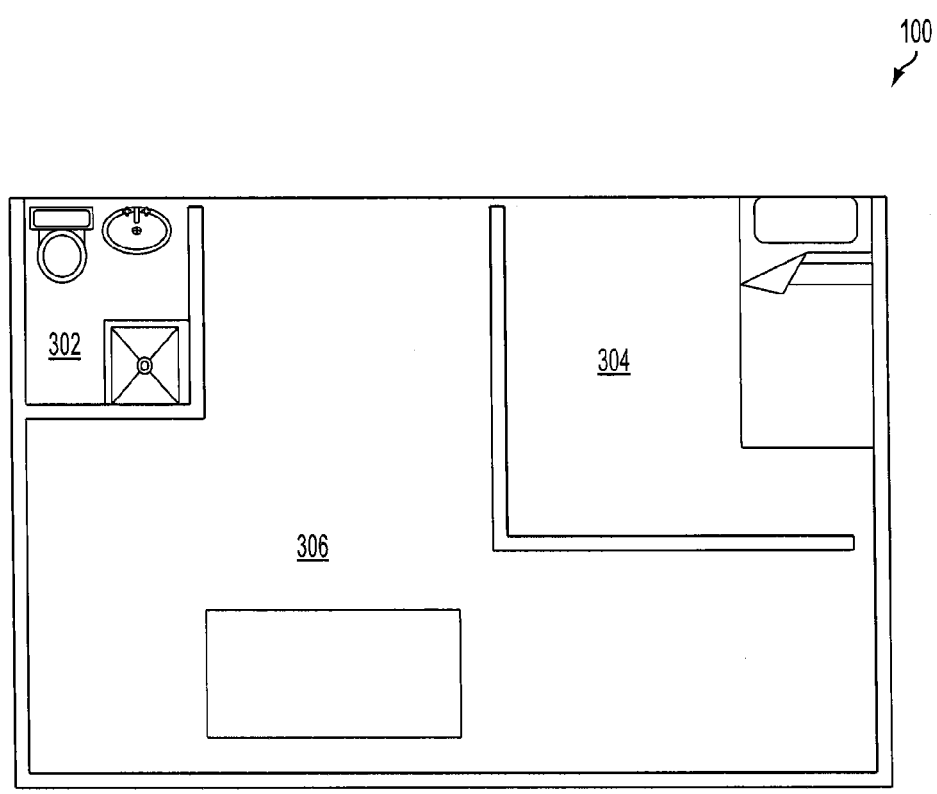
FIG. 3 illustrates a floor plan of an embodiment of the modular structure.

Referring now to FIG. 3, a floor plan is shown of an embodiment of the modular structure 100. In a typical embodiment, the modular structure 100 includes a bathroom 302 and a sleeping area 304, each separated from a main area 306 of the modular structure 100; however, one skilled in the art will recognize that various other floor plans could be used.

Figure 4:
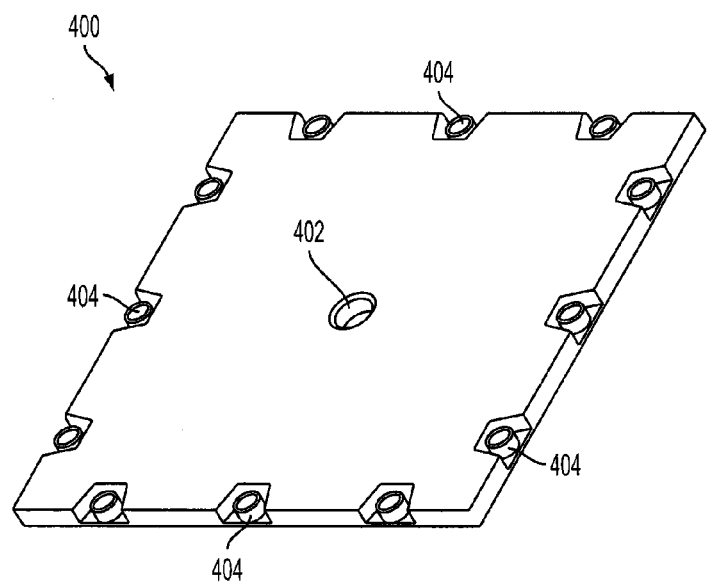
FIG. 4 illustrates an embodiment of an interior floor tile of the modular structure.

Referring now to FIG. 4, an embodiment of an interior floor tile 400 is shown for use in forming a base of the modular structure 100. In a typical embodiment, the interior floor tile 400 includes an aperture 402 disposed, for example, in a central portion thereof. A plurality of couplers 404 are disposed around a periphery of the interior floor tile 400. In various other embodiments, any number of apertures 402 could be used with the interior floor tile 400.

Figure 5:
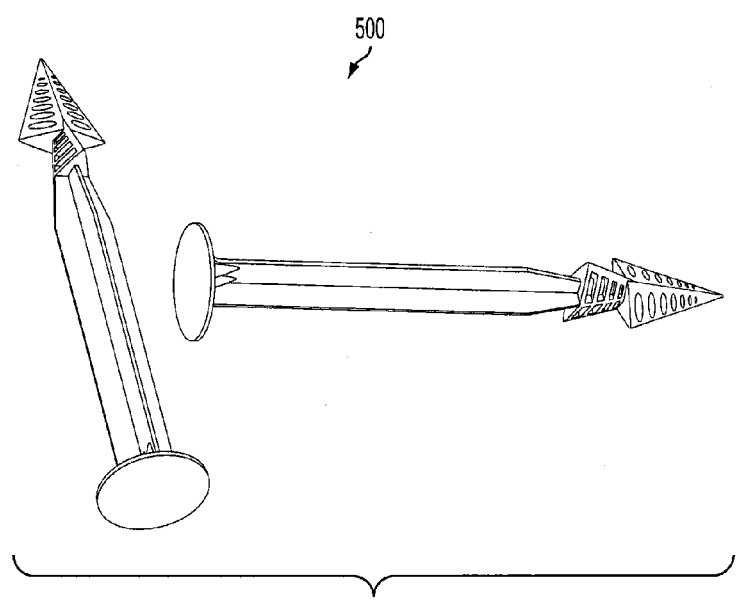
FIG. 5 illustrates an embodiment of a stake for use with the modular structure.

Referring now to FIG. 5, a stake 500 is shown that may be used in various embodiments of the modular structure 100. In a typical embodiment, at least one of the interior floor tiles 400 having an aperture 402 disposed therein may be placed on the ground. The stake 500 may be pushed or hammered through the aperture 402 to secure the interior floor tile 400 to the ground or other substrate.

Figure 6:
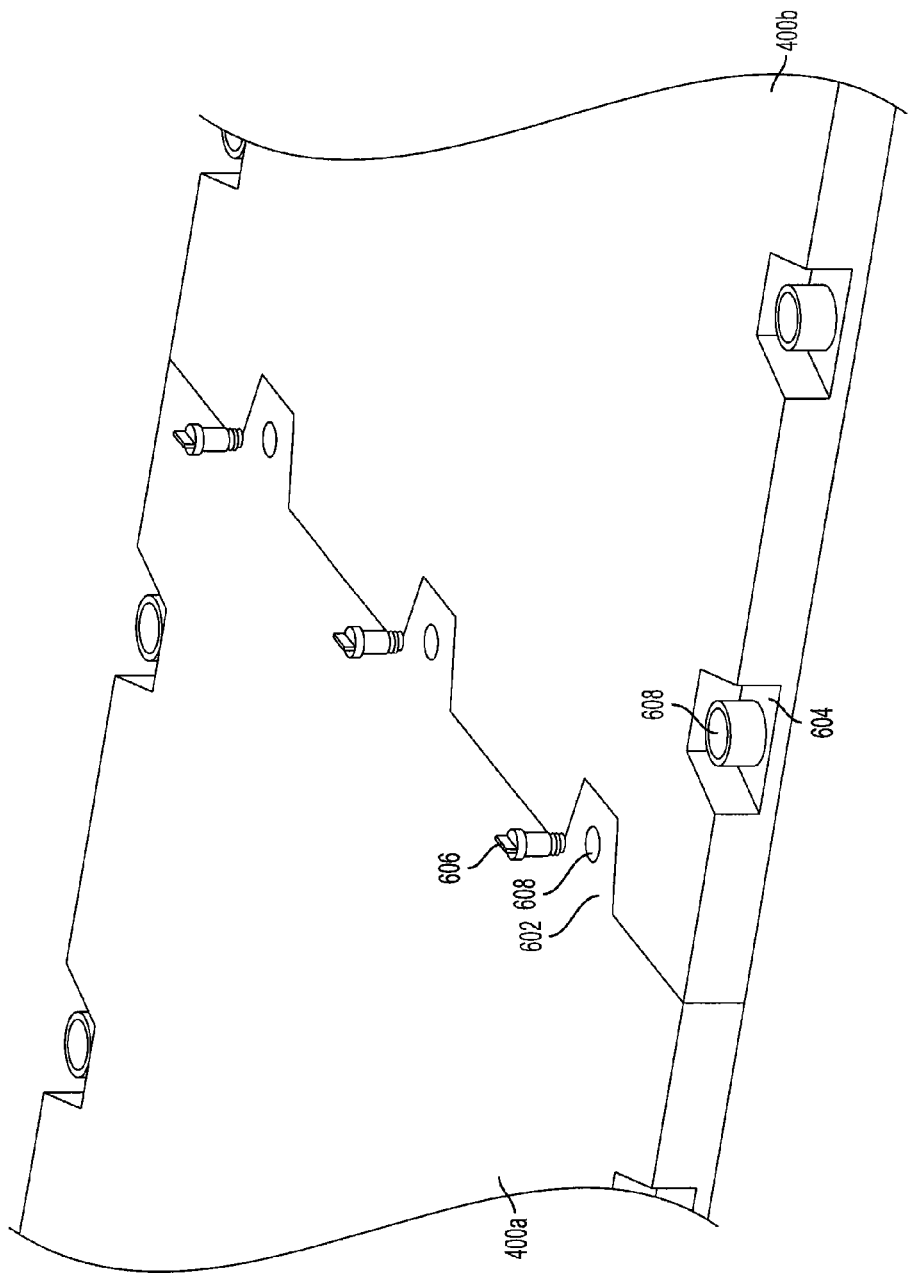
FIG. 6 illustrates the floor tile of FIG. 4 being coupled to another floor tile using screw connectors.

Referring now to FIG. 6, two floor tiles 400a and 400b are shown coupled together. In a typical embodiment, the floor tile 400b includes a plurality of flanges 602 protruding from an edge thereof. The plurality of flanges 602 are adapted for engagement with a plurality of recesses 604 disposed along an edge of floor tile 400a. In a typical embodiment, once the two floor tiles 400a and 400b are engaged, a plurality of removable screw connectors 606 are inserted into a plurality of pre-formed holes 608 disposed in the plurality of flanges 602 and the plurality of recesses 604 to securely fasten the engagement. In some embodiments, the plurality of removable screw connectors 606 extend past a bottom surface of the floor tile 400a to engage the ground or other substrate disposed therebeneath. In this way, upward pressure provided by the plurality of screw connectors pushes against the stake 500 disposed within the aperture 402 to further secure the floor tiles 400a and 400b thereby reducing movement. Additionally, engagement of the plurality of removable screw connectors 606 with the ground or other substrate allows the floor assembly 102 to be leveled with respect to the ground or other substrate. In a typical embodiment, the plurality of removable screw connectors may be disengaged from the floor tiles 400a and 400b without causing damage to the floor tiles 400a and 400b.

Figure 7:
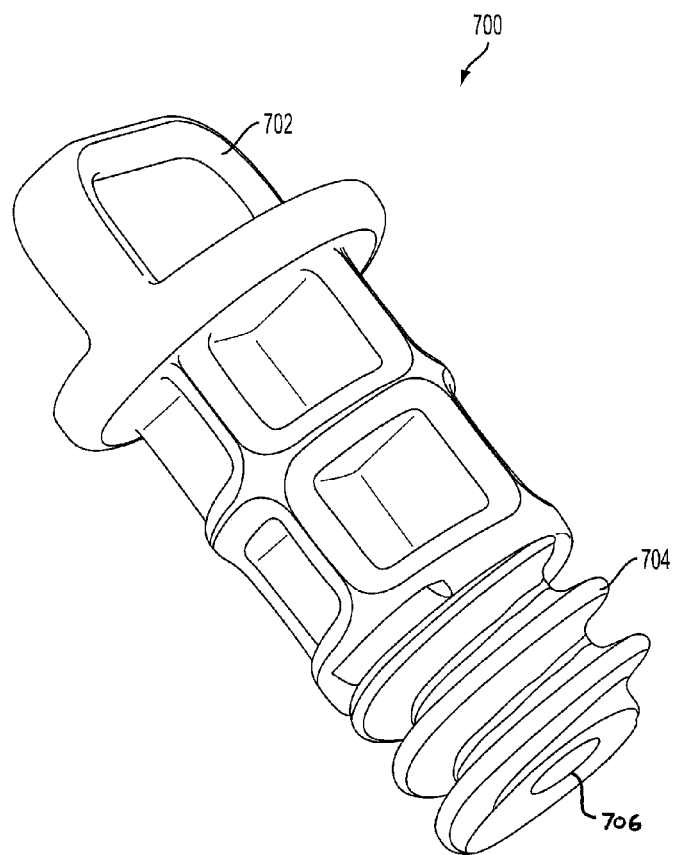
FIG. 7 illustrates an embodiment of a screw connector of FIG. 6.

Referring now to FIG. 7, an embodiment of a removable screw connector of the plurality of removable screw connectors (shown as 606 in FIG. 6) is shown. In a typical embodiment, a screw connector 700 includes a handle portion 702, and at least one thread 704. In a typical embodiment, the at least one thread 704 engages a corresponding thread disposed within the plurality of pre-formed holes 608 (shown in FIG. 6). In a typical embodiment, the handle portion 702 allows the plurality of removable screw connectors 606 to be installed and removed without the use of power tools. In various alternative embodiments, an aperture 706 is disposed within the at least one thread 704. The aperture engages a stabilizer (not explicitly shown). In a typical embodiment, the stabilizer is in communication with the ground.

Figure 8:
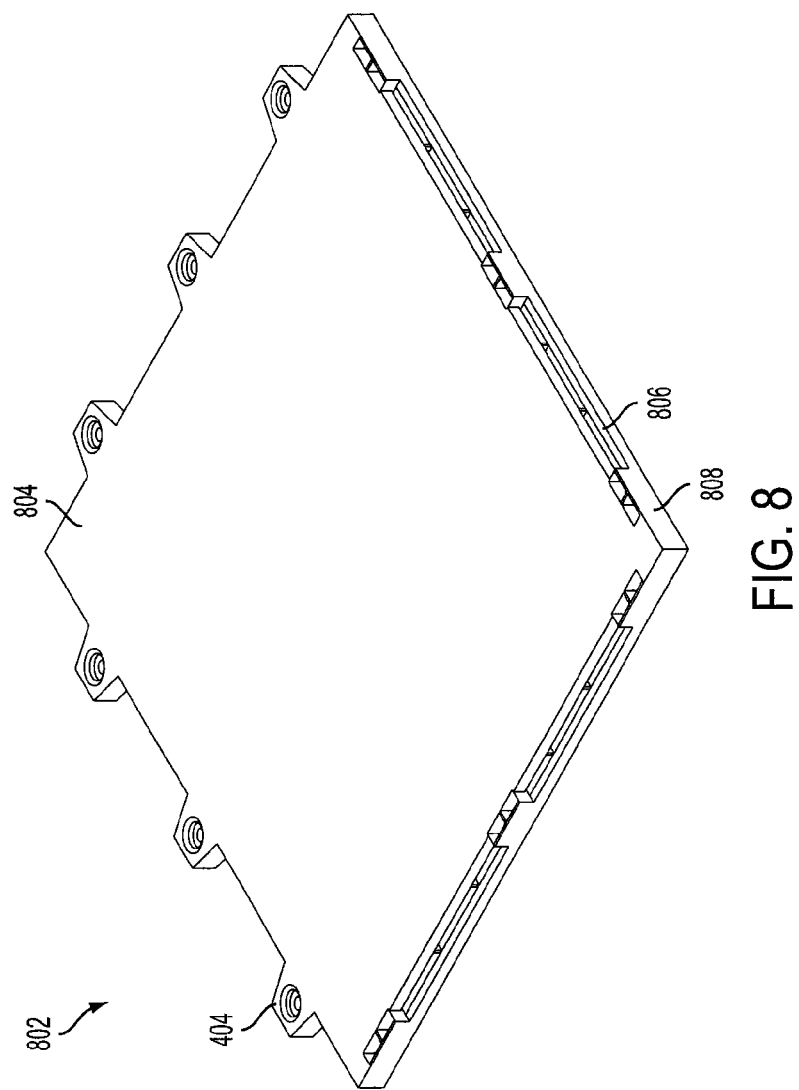
FIG. 8 illustrates an embodiment of a exterior floor tile of the modular structure.

Referring now to FIG. 8, an embodiment of an exterior floor tile 802 is shown. In a typical embodiment, the plurality of couplers 404 are disposed around interior edges 804 of the exterior floor tile 802. In a typical embodiment, a plurality of connector grooves 806 are disposed around the exterior edges 808 of the exterior floor tile 802. The connector grooves 806 allow the exterior floor tile 802 to be engaged to the sidewall panels 104 (shown in FIG. 1).

Figure 9:
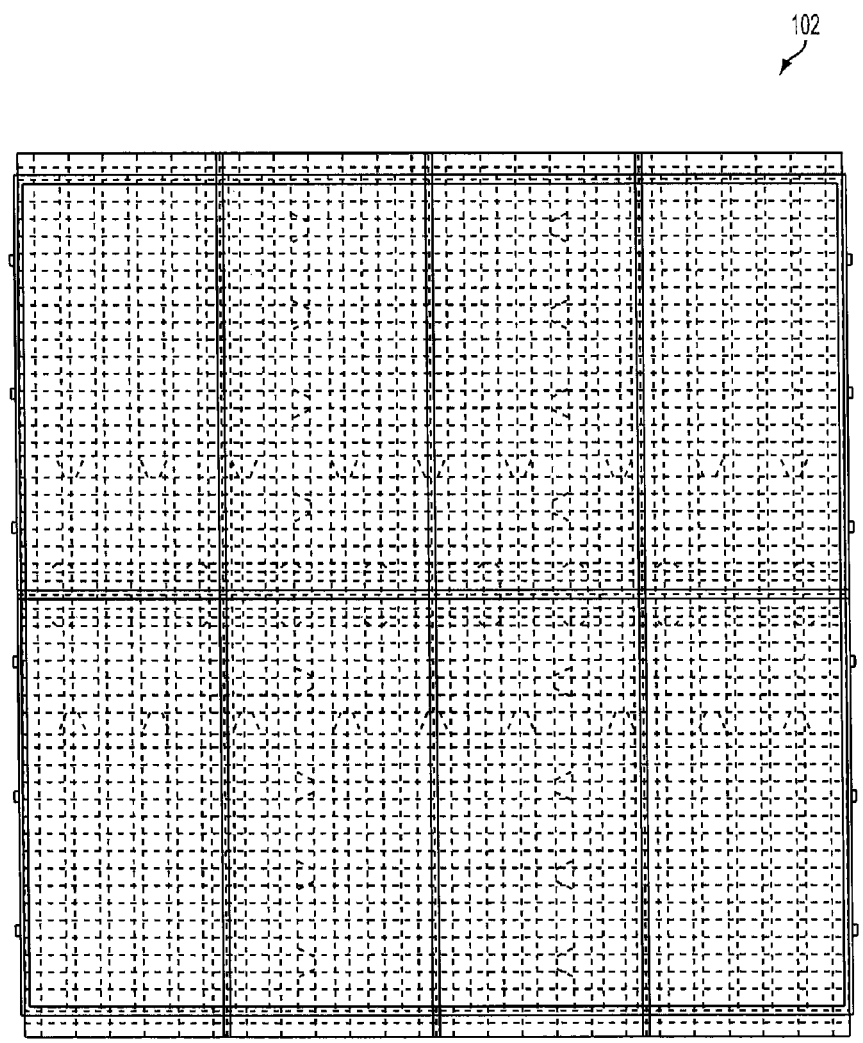
FIG. 9 illustrates an embodiment of a floor assembly of the modular structure.

Referring now to FIG. 9, a top view is shown of the floor assembly 102 of the modular structure 100. In the embodiment shown, the floor assembly 102 is includes a plurality of the interior floor tiles and a plurality of the exterior floor tiles. As shown in FIG. 9 the floor assembly 102 includes, for example, nine floor tiles; however, one skilled in the art will recognize that, in various alternative embodiments, the floor assembly 102 could include any number of the plurality of floor tiles. As can be seen, each floor tile engages adjacent floor tiles.

Figure 10:
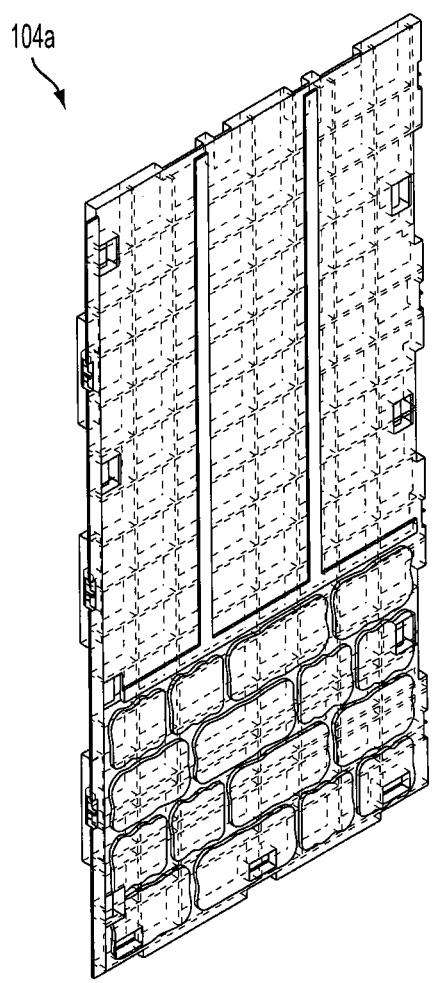
FIG. 10 illustrates an embodiment of a sidewall panel of the modular structure.
Figure 11:
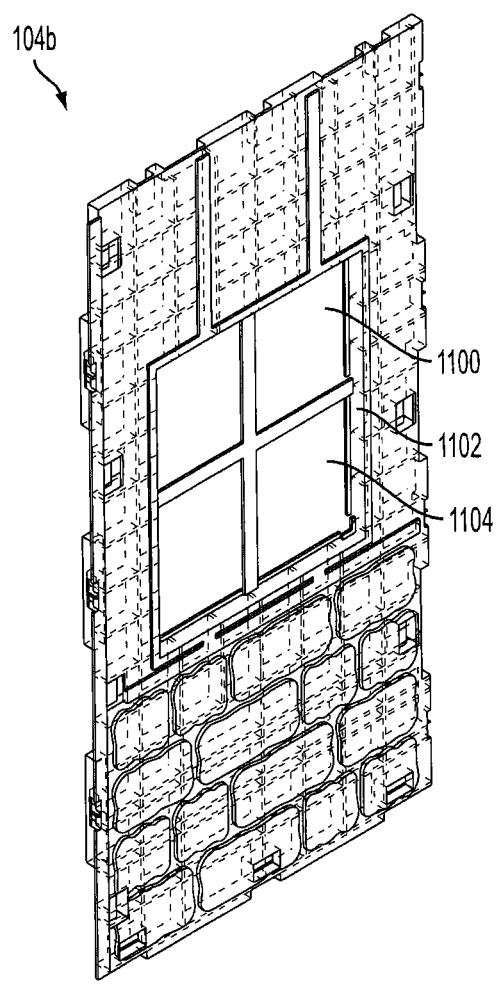
FIG. 11 illustrates an embodiment of a sidewall panel of the modular structure having a window disposed therein.
Figure 12:
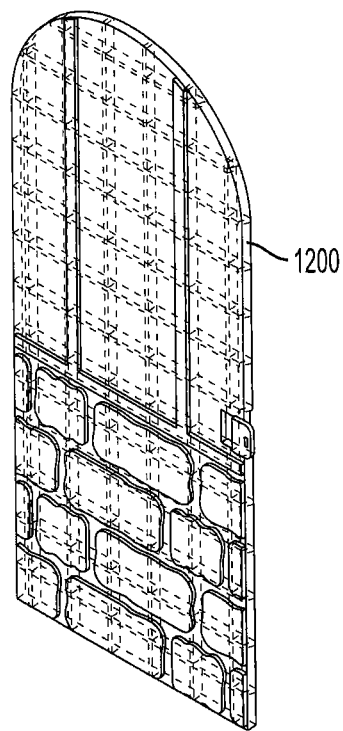
FIG. 12 illustrates an embodiment of a door of the modular structure.

Referring now to FIGS. 10, 11, and 12, various embodiments of the sidewall panel 104 of FIG. 1 are shown. In FIG. 10, sidewall panel 104a can be seen having a textured outer surface for aesthetic appeal. In FIG. 11, sidewall panel 104b can be seen having a window 1100 disposed therein. In a typical embodiment, the window 1100 includes a frame 1102 and a removable pane 1104. The removable pane 1104 is secured to the frame 1102 by a plurality of screws (not explicitly shown). For example, screw connectors 700 or other appropriate fastener to allow for installation and removal of the removable pane 1104 to the frame 1102. In a typical embodiment, the removable pane 1104 may be detached from the frame 1102 thus allowing the window 1100 to be used as an egress. In FIG. 12, a door 1200 is shown for use in conjunction with a sidewall panel having a corresponding door-shaped cutout therein. In some embodiments, the panels may be formed utilizing a structural foam molded application (SFM). In various embodiments, the sidewall panels 104 may be formed of, for example, high-density polyethylene ("HDPE") with various additives so the material will be VO rated for fire retardation, have increased heat deflection, and be available in a plurality of colors.

Figure 13:
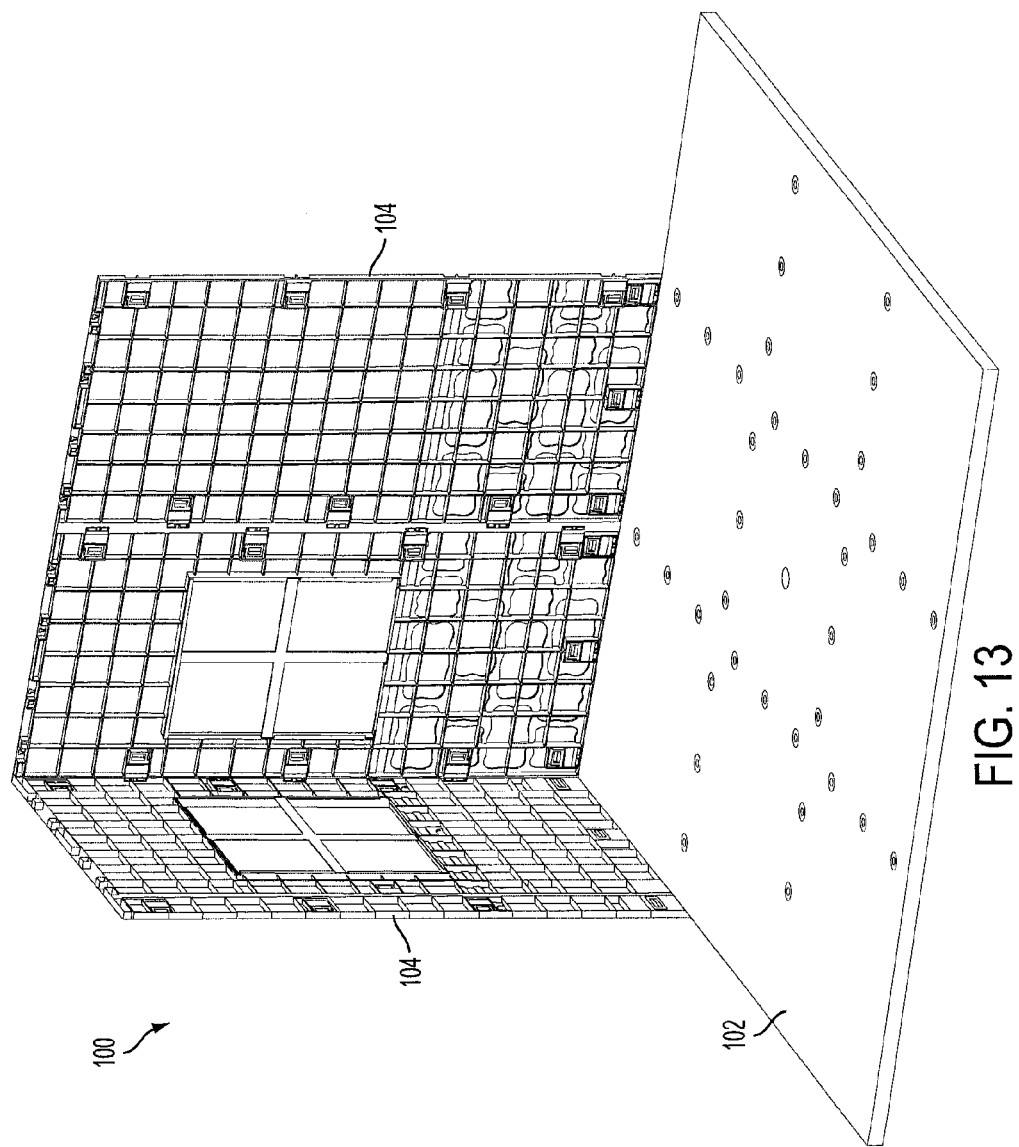
FIG. 13 illustrates an embodiment of the floor assembly of the modular structure having a plurality of sidewall panels coupled thereto.
Figure 14:
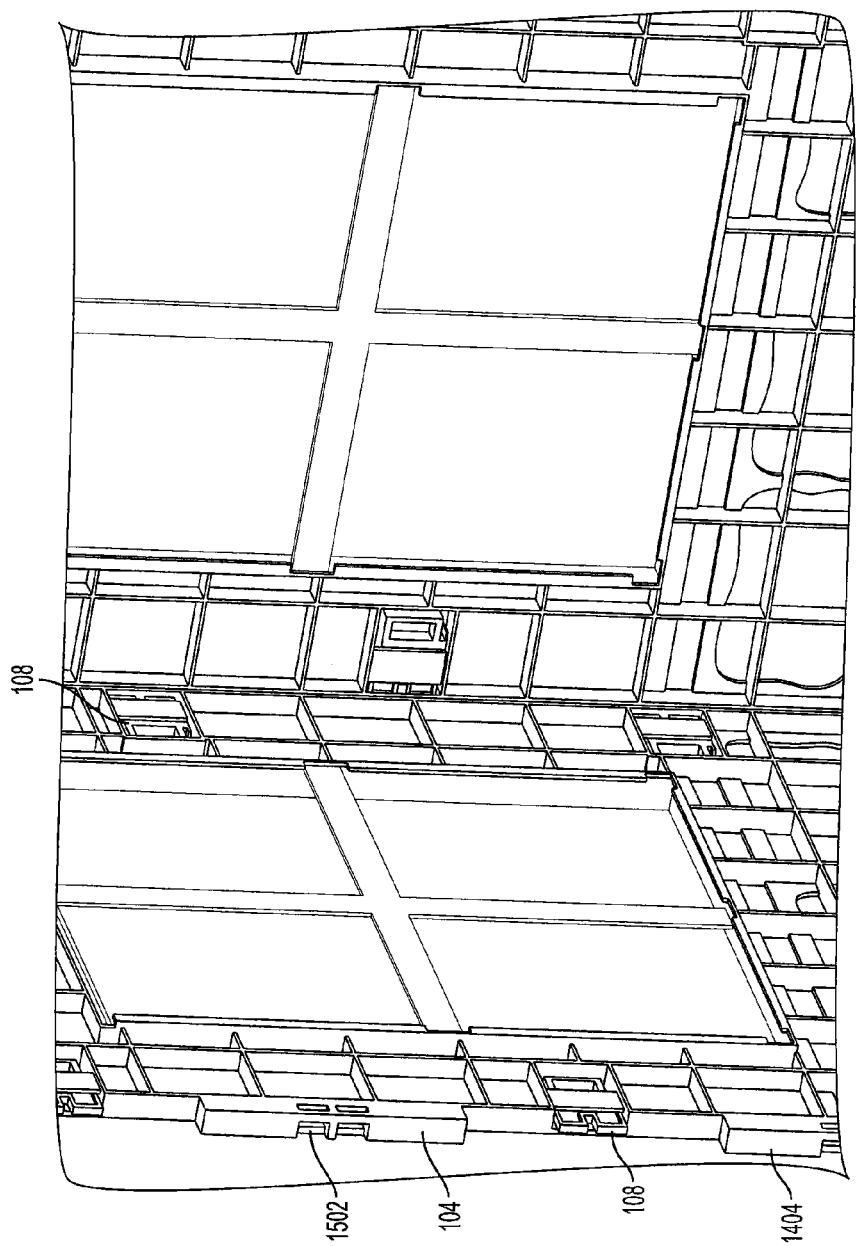
FIG. 14 illustrates an embodiment of two sidewall panels coupled together.

Referring now to FIG. 13, a floor assembly 102 of the modular structure 100 is shown having the plurality of sidewall panels 104 coupled thereto in an upright position. Referring now to FIG. 14, a close-up is shown of two exemplary sidewall panels 104. A plurality of removable slide latches 108 can be seen along an intersection 1404 of two exemplary sidewall panels 104. The plurality of removable side latches 108 allows the sidewall panels 104 to be secured together thereby sealing the intersection 1404. In a typical embodiment, the plurality of removable slide latches 108 are disposed within a slot in the sidewall panel 104 and are adapted to engage a corresponding pre-formed aperture 1502 in a proximately-disposed sidewall panel 104. In addition, in various embodiments, the plurality of removable slide latches 108 are adapted to allow a user to disengage the slide latch allowing for disassembly of the modular structure 100. In some embodiments, the plurality of removable slide latches 108 may be adapted to pull two sidewall panels 104 closer together to ensure a tight seal of the intersection 1404 therebetween.

Figure 15:
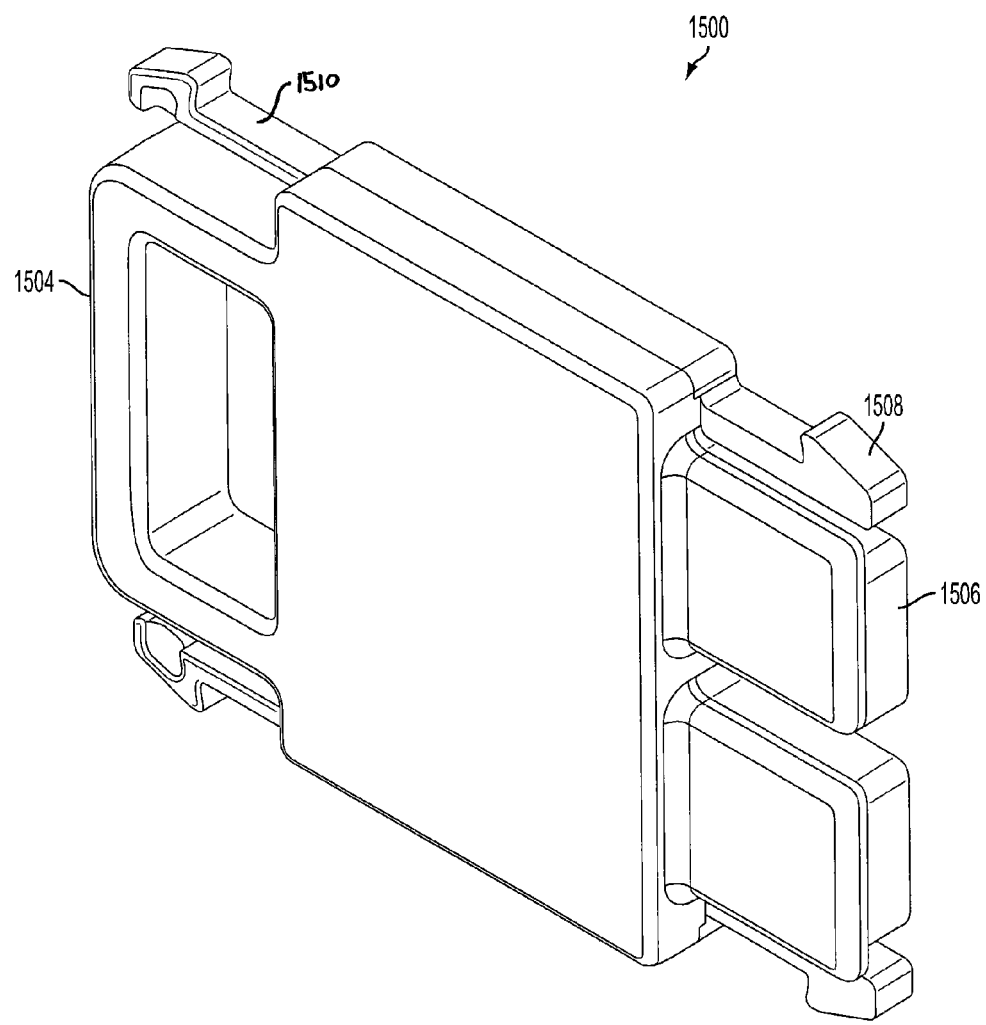
FIG. 15 illustrates an embodiment of a slide latch of FIG. 14.

Referring now to FIG. 15, an exemplary embodiment is shown of a slide latch of the plurality of removable slide latches 108. In a typical embodiment a slide latch 1500 includes a handle region 1504 and a tongue region 1506. During operation, the tongue region 1506 engages the pre-formed apertures 1502 in the sidewall panel 104. In a typical embodiment, a first plurality of barbs 1508 are disposed alongside the tongue region 1506. The first plurality of barbs 1508 provide further operative engagement between the pre-formed aperture 1502 and the tongue region 1506 and prevent inadvertent disengagement of the tongue region 1506 from the pre-formed aperture 1502. Likewise, a second plurality of barbs 1510 are disposed on either side of the handle region 1504. The second plurality of barbs 1510 engage and hold an adjacent sidewall panel 104. Thus, the first plurality of barbs 1508 and the second plurality of barbs 1510 hold adjacent sidewall panels 104 together.

Figure 16:
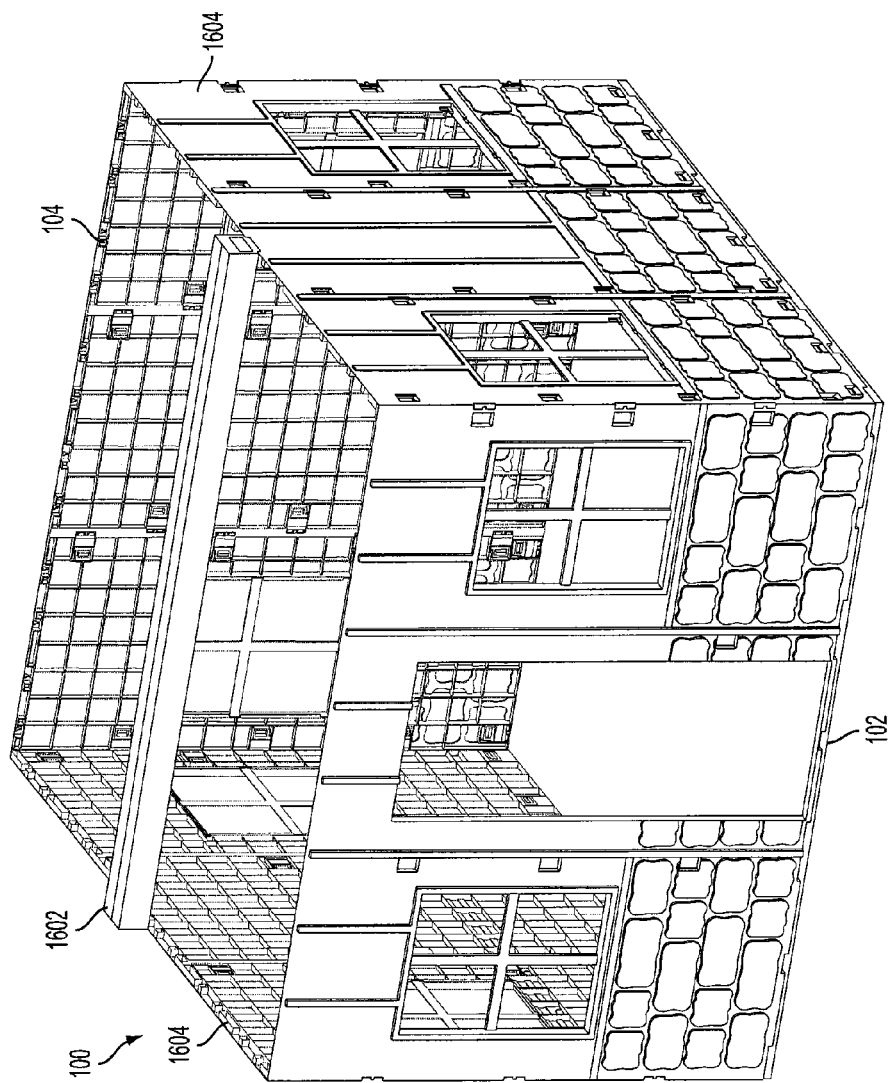
FIG. 16 illustrates an embodiment of the modular structure having a roof beam attached thereto.

Referring now to FIG. 16, the modular structure 100 is shown in a partially-built state. In the embodiment shown, the sidewall panels 104 encircling the floor assembly 102 have been assembled and a roof beam 1602 has been disposed across a top of two oppositely-disposed sides 1604 of the modular structure 100. In some embodiments, two roof beams 1602 may be utilized to span across an entire width of the modular structure 100.

Figure 17:
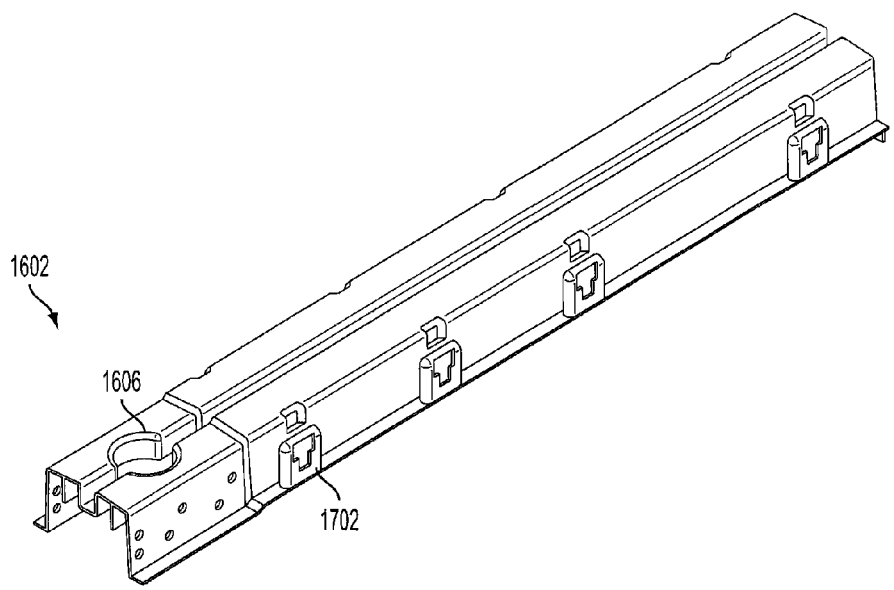
FIG. 17 illustrates an embodiment of the roof beam of FIG. 16.

Referring now to FIG. 17, an embodiment is shown of the roof beam 1602 of FIG. 16. As can be seen in the embodiment shown, one end of the roof beam 1602 may be adapted to engage with a second roof beam (not explicitly shown). In addition, in some embodiments, the roof beam 1602 may include a recess 1606 to receive, for example, a pole or other structural support. In the embodiment shown, the roof beam 1602 includes a plurality of connectors 1702 adapted to receive a plurality of roof panels (not explicitly shown).

Figure 18:
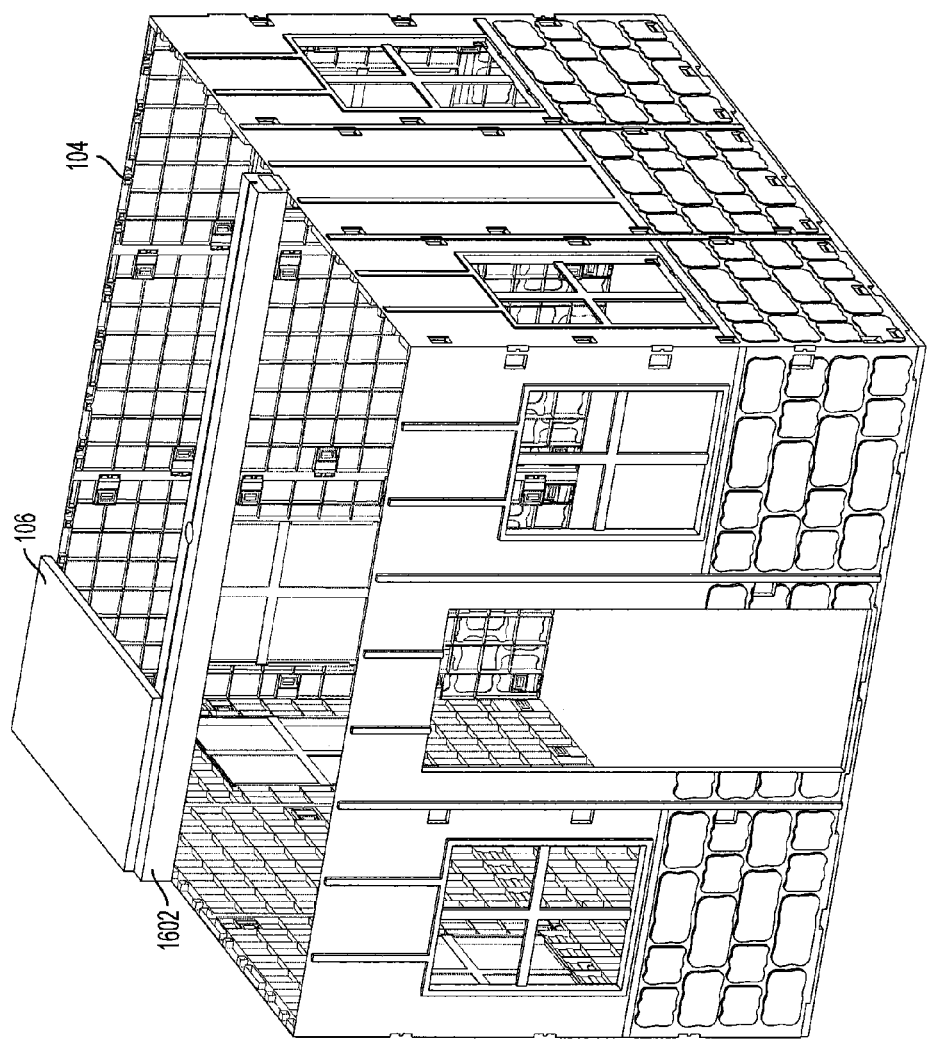
FIG. 18 illustrates a roof panel disposed atop the roof beam of FIG. 16.
Figure 19:
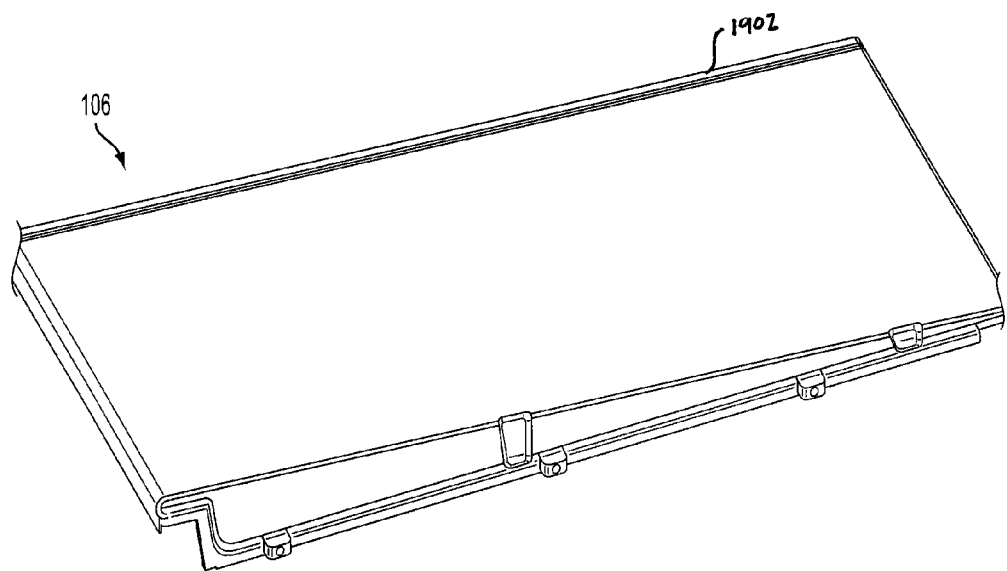
FIG. 19 illustrates an embodiment of the roof panel of FIG. 18.

Referring now to FIG. 18, a roof panel 106 is shown spanning a distance between the roof beam 1602 and the sidewall panels 104. In FIG. 19, an embodiment of a roof panel 106 is shown. In various embodiments, the roof panel 106 is adapted to engage the roof beam 1602 on one end and the sidewall panels 104 on an opposite end. Additionally, in various embodiments, the roof panel 106 may be adapted to engage the sidewall panels 104 along one side thereof and engage a second roof panel 106 along an opposite side thereof. In a typical embodiment, the roof panel 1602 includes a lip 1604. The lip 1902 overlaps an adjacent roof panel 1604 and prevents infiltration of water into the modular structure 100.

Figure 20:
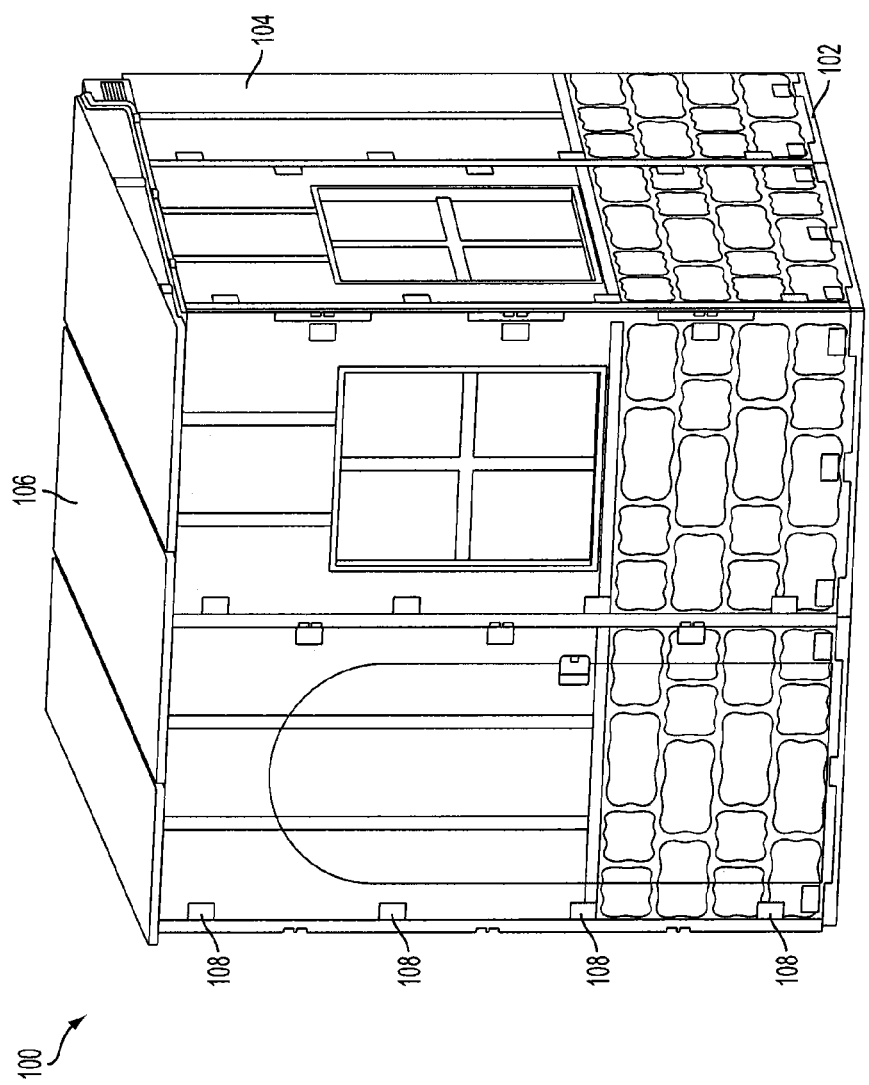
FIG. 20 illustrates a front sectional view of an embodiment of the modular structure.

Referring now to FIG. 20, a sectional view of the modular structure 100 is shown having a plurality of roof panels 106 disposed on an upper portion thereof. Additionally, a plurality of removable slide latches 108 can be seen for coupling the plurality of sidewall panels 104 together, coupling the plurality of sidewall panels 104 to the floor assembly 102, and coupling the plurality of sidewall panels 104 to the plurality of roof panels 106. In some embodiments, the modular structure 100 is able to withstand temperatures up to 185 degrees Fahrenheit or more and is able to withstand winds up to 110 mph or more.

Figure 21:
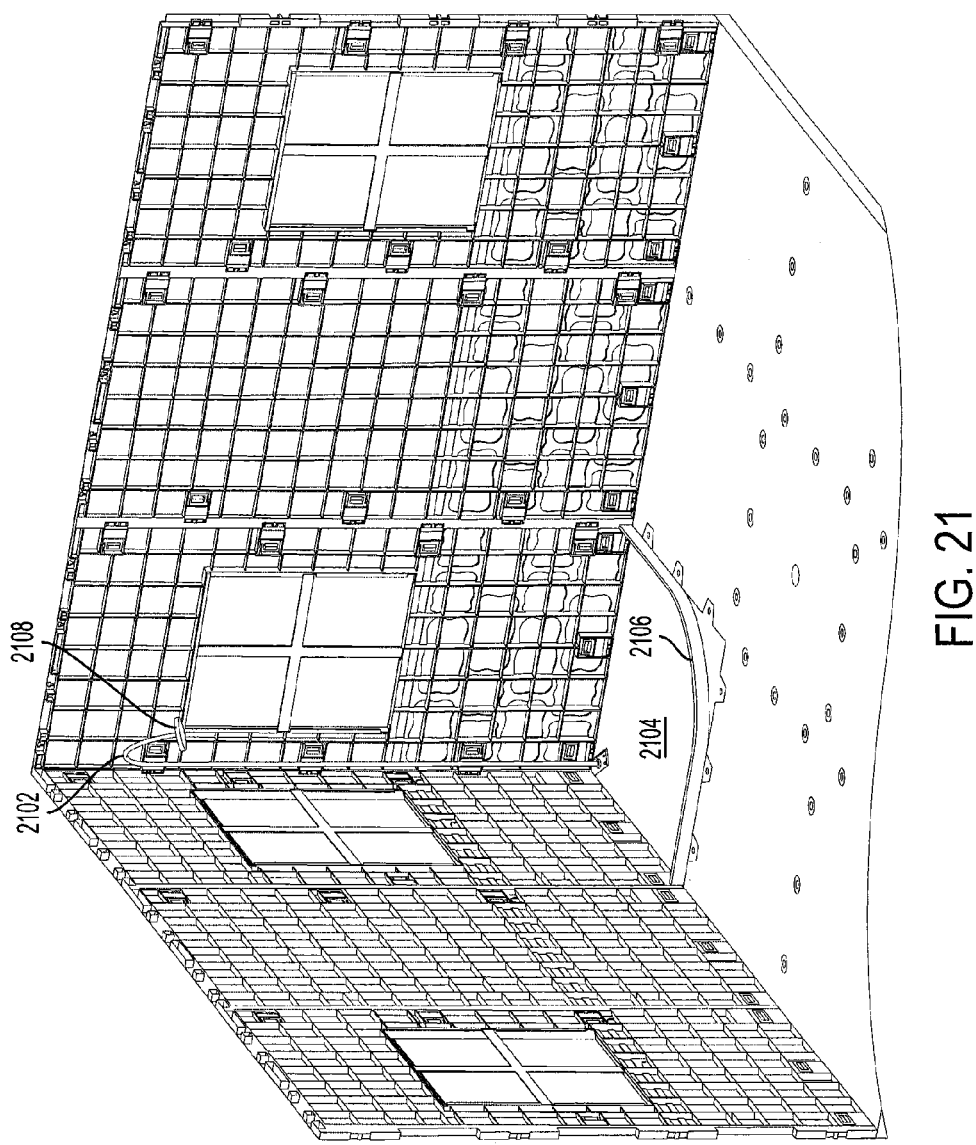
FIG. 21 illustrates an interior view of an embodiment of the modular structure having a shower installed therein.

Referring now to FIG. 21, an interior view of the modular structure 100 is shown having a shower installed 2102 therein. In the embodiment shown, a corner floor tile 2104 having a raised lip or ridge 2106 is shown along with a shower head 2108.

Figure 22:
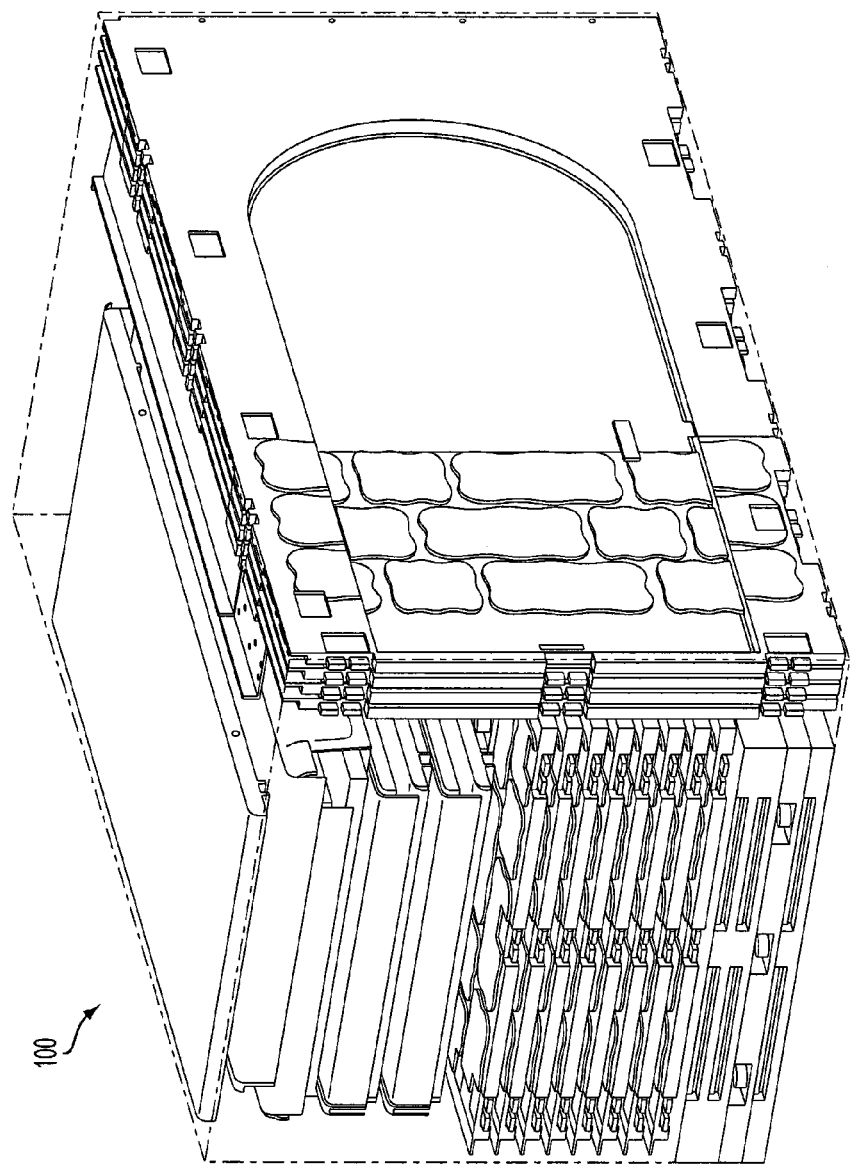
FIG. 22 illustrates an embodiment of the modular structure in a disassembled state for shipping or storage.

Referring now to FIG. 22, the modular structure 100 is shown in a dissembled state. In the embodiment shown, component parts of the modular structure 100 are adapted for efficient packaging and shipping. In some embodiments, a weight of the disassembled parts may be less than one thousand pounds.

Figure 23:
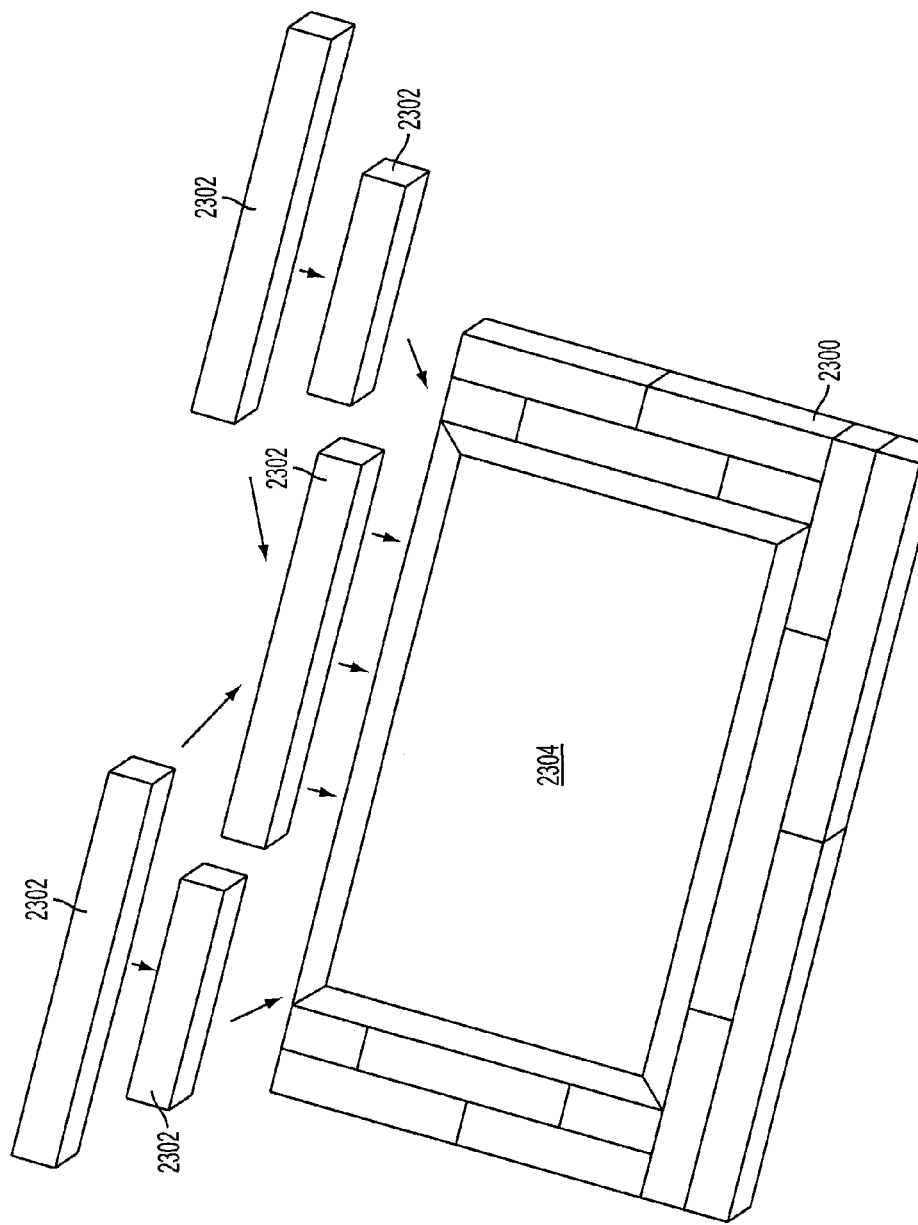
FIG. 23 is an exploded view of an elevated deck according to an exemplary embodiment.

Referring now to FIG. 23, there is shown an exploded view of an elevated deck 2300. In a typical embodiment, the elevated deck includes a plurality of side panels 2302. The plurality of side panels 2302 form a recessed area 2304 for receiving the floor assembly 102 of the modular structure 100. In a typical embodiment, the elevated deck includes at least one mechanism for securing the floor assembly 102 to the elevated deck 2300. In various embodiments, the elevated deck may include a plurality of pins (not explicitly shown). The plurality of pins engage the apertures 402 disposed within the plurality of floor tiles 400. In various alternative embodiments, a metal bar (not explicitly shown) may be used to secure the floor assembly 102 to the elevated deck 2300.

Figure 24:
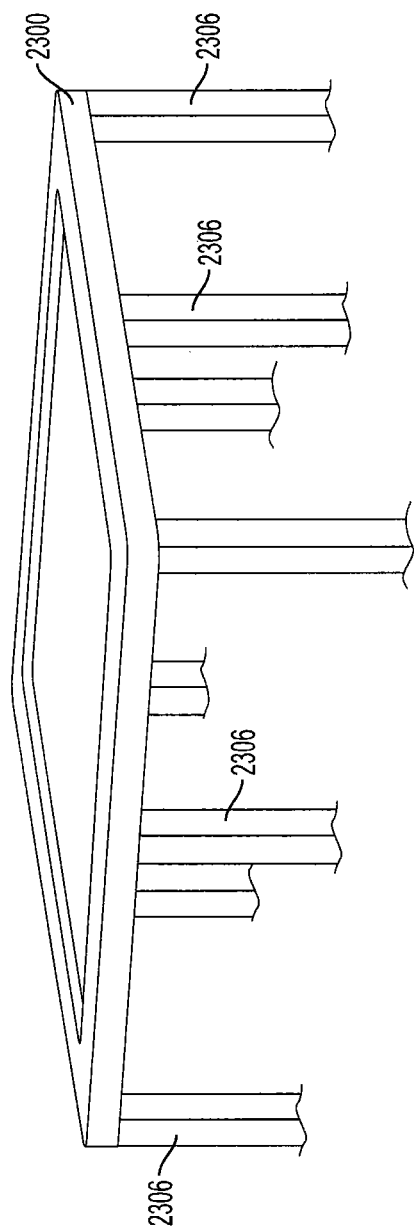
FIG. 24 is a perspective view of an elevated deck according to an exemplary embodiment.
Figure 25:
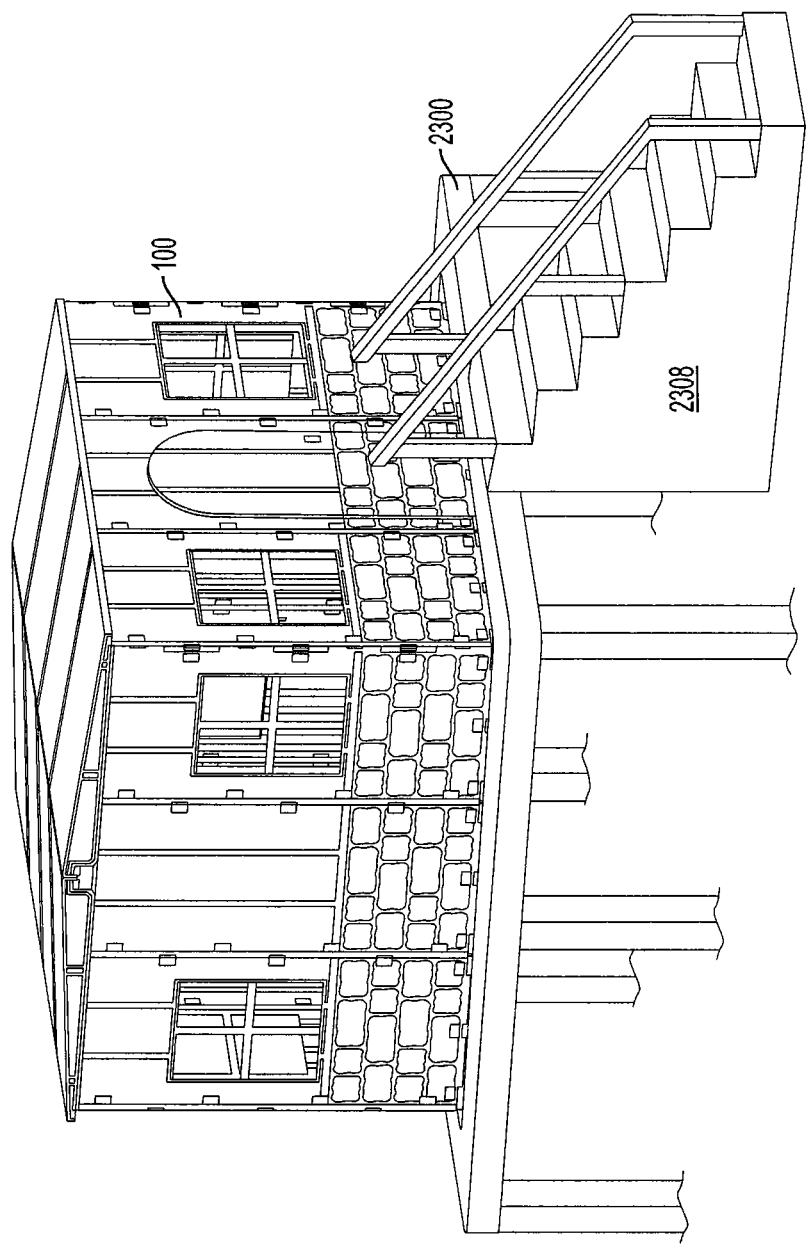
FIG. 25 is a perspective view of an elevated deck having a modular structure assembled thereon according to an exemplary embodiment.

Referring now to FIG. 24, there is shown a perspective view of an assembled elevated deck. In a typical embodiment, the elevated deck 2300 includes a plurality of legs 2306. The plurality of legs raise the elevated deck approximately 2-3 feet; however, one skilled in the art will recognize that any height could be used. Referring now to FIG. 25, there is shown an elevated deck 2300 having the modular structure 100 assembled thereon. In a typical embodiment, a plurality of stairs 2308 may be used in conjunction with the elevated deck 2300 to allow ingress and egress from the modular structure 100.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A modular structure comprising:
a plurality of floor tiles having a central aperture disposed therein and a plurality of couplers disposed around a perimeter thereof;
a plurality of sidewall panels operatively coupled to the plurality of floor tiles;
a plurality of roof panels disposed above and operatively coupled to the plurality of sidewall panels;
a plurality of removable latches for securing adjacent sidewall panels of the plurality of sidewall panels, the plurality of removable latches operatively engaging a plurality of pre-formed apertures in an intersection between adjacent sidewall panels;
a plurality of removable screw connectors for securing adjacent floor tiles of the plurality of floor tiles, the plurality of removable screw connectors engaging a plurality of pre-formed holes in the plurality of floor tiles;
wherein the plurality of floor tiles are secured to a substrate by a stake disposed through the central aperture;
wherein the plurality of removable screw connectors extend through a bottom surface of the plurality of floor tiles and engage a substrate therebelow, the engagement of the plurality of removable screw connectors and the substrate placing the stake in tension;
wherein adjustment of the plurality of screw connectors allows the plurality of floor tiles to be leveled.

2. The modular structure of claim 1, further comprising a plurality of stakes disposed through the central aperture for securing the plurality of floor tiles to a substrate.

3. The modular structure of claim 1, wherein the modular structure comprises a bathroom and a sleeping area.

4. The modular structure of claim 3, wherein the bathroom comprises a shower.

5. The modular structure of claim 1, further comprising an elevated base structure.

6. The modular structure of claim 5, wherein the elevated base structure comprises:
a recessed area for receiving the plurality of floor tiles; and
a clamping member disposed proximate to the recessed area for securing the plurality of floor tiles.

7. The modular structure of claim 1, wherein the plurality of floor tiles, the plurality of sidewall panels, and the plurality of roof panels are insulated.

8. The modular structure of claim 1, wherein at least one sidewall panel of the plurality of sidewall panels comprises a window.

9. The modular structure of claim 8, wherein the window comprises a frame and a removable pane.

10. The modular structure of claim 9, wherein the removable pane may be detached from the frame for use as an egress.

11. The modular structure of claim 1, wherein at least one sidewall panel of the plurality of sidewall panels comprises a door.

12. A method for assembling a modular structure, the method comprising:
coupling a plurality of floor tiles utilizing a plurality of removable screw connectors engaged with a plurality of pre-formed holes in the plurality of floor tiles;
securing, via the plurality of screw connectors and a plurality of stakes, the plurality of floor tiles to a substrate;
assembling a plurality of sidewalls to the plurality of floor tiles utilizing a plurality of removable latches;
securing adjacent sidewall panels of the plurality of sidewall panels by engaging the plurality of removable latches with a plurality of pre-formed apertures formed in adjacent sidewall panels of the plurality of sidewall panels; and
assembling a plurality of roof panels to the plurality of sidewall panels.

13. The method of claim 12, further comprising leveling, via the plurality of screw connectors, the plurality of floor panels.

14. The method of claim 12, further comprising securing the plurality of floor panels to a substrate via a plurality of stakes.

15. The method of claim 12, further comprising disposing a roof beam above and between two sidewall panels of the plurality of sidewall panels, the two sidewall panels disposed on opposite sides of the modular structure.

16. The method of claim 15, wherein said assembling the plurality of roof panels comprises assembling the plurality of roof panels to the roof beam such that adjacent roof panels overlap one another.

17. The method of claim 12, further comprising providing an elevated base structure for receiving the plurality of floor tiles.

18. The method of claim 17, further comprising securing the plurality of floor tiles to the elevated base structure.

19. The method of claim 12, further comprising delivering a modular-structure bundle to a modular-structure site.

20. The method of claim 19, wherein the modular-structure bundle comprises the plurality of floor tiles, the plurality of sidewall panels, and the plurality of roof panels.

* * * * *